June 17, 1941.  M. W. FRASER  2,246,487
PLANETARY PUMP
Filed Aug. 15, 1939
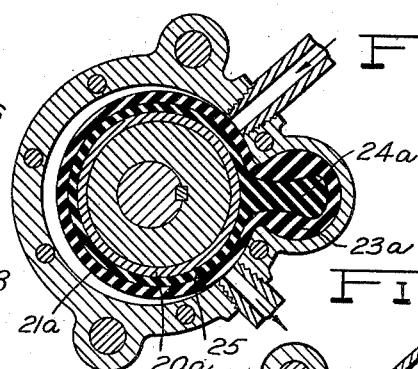
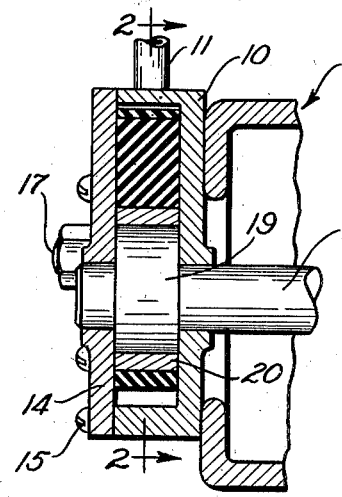
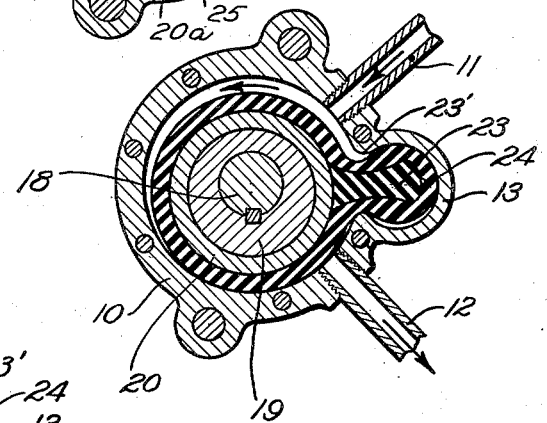
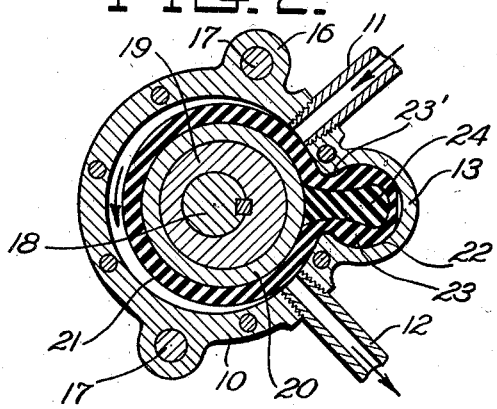
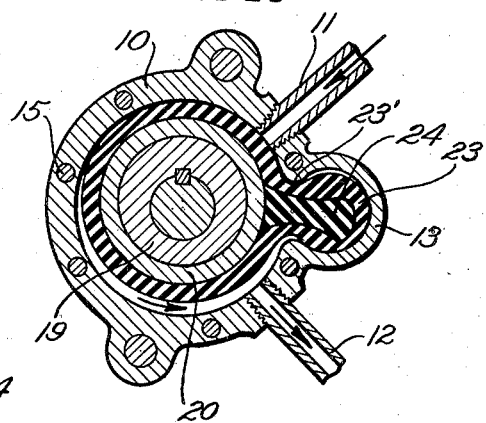
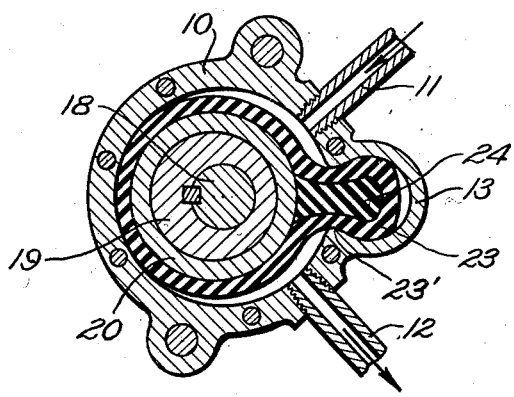
Inventor
Malcolm W. Fraser Patented June 17, 1941

2,246,487

UNITED STATES PATENT OFFICE 2,246,487

PLANETARY PUMP

Malcolm W. Fraser, Toledo, Ohio, assignor to Detroit Harvester Company, Detroit, Mich., a corporation of Michigan Application August 15, 1939, Serial No. 290,274

3 Claims. (Cl. 103—131)

This invention relates to rotary force pumps but more particularly to planetary pumps of the type employing a rotatable eccentric disc.

An object is to produce a new and improved rotary pump of the planetary type having a rotatable eccentric member with which an annulus is concentric, the annulus having a resilient working surface and a resilient extension at one end providing a partition between the inlet and outlet ports, the extension having a core which is relatively rigid as compared to the outer lamination but of substantially the same material so that the annulus, extension and core may be conveniently formed as by molding in a simple and economical manner.

Another object is to produce a planetary pump of the above character in which the rotatable eccentric rotates relatively to a concentric member to which is bonded a layer of rubber or rubber-like material which has a partition extension arranged between the inlet and outlet ports which is also of rubber or rubber-like material having a stiff core of rubber or rubber-like material cohered to the outer layer which affords the desired flexibility and resiliency.

Other objects and advantages of the invention will hereinafter appear and, for purposes of illustration but not of limitation, embodiments of the invention are shown on the accompanying drawing in which Figure 1 is a sectional elevation of the planetary pump and casing;

Figure 2 is a sectional view taken substantially on the line 2—2 of Figure 1;

Figures 3, 4 and 5 are sectional views similar to Figure 2 but showing the parts in different positions occupied in the operation of the pump;

Figure 6 is a sectional view of an alternate form of pump in which the relatively rigid or hard rubber portion encircles the metallic sleeve or bushing element.

The illustrated embodiment of the invention comprises a substantially cup-shaped casing or housing 10 formed with a radial inlet conduit 11 and outlet conduit 12 which are disposed in relatively close juxtaposed relation, there being an enlargement 13 of the housing intermediate the inlet and outlet ports. The open end of the housing is closed by a disc 14 which is secured to the housing by screws 15. The housing in this instance has bosses 16 through which extend bolts 17 for securing the housing to a suitable support S. Having bearing in a wall of the housing 10 and in the closure plate or disc 14 is a rotary shaft 18 to which is keyed an eccentrically mounted disc 19 which approximately fills the space between the closure disc 14 and the bottom wall of the housing 10.

The eccentric disc 19 fits within a metallic sleeve or bushing 20 which is concentric with the disc which rotates relatively thereto. On the outside of the bushing 20 and bonded thereto is a sleeve or layer 21 which is relatively flexible and resilient. The layer 21 may be of rubber or rubber-like material, such as rubber substitutes, and the structure and characteristics of this layer will be governed to a large extent by the use for which the pump is intended. Certain well-known rubber substitutes are found more desirable when the pump is used for handling gasoline or similar fluids and, therefore, it is to be understood that the word "rubber" used herein is not limited solely to rubber materials but other materials having the flexible and resilient characteristics of rubber are comprehended herein.

It will be observed that the housing enlargement 13 is formed with an annular cavity 22 and between it and the pumping chamber is a constricted throat 23'. As shown, the relatively resilient rubber layer 21 is provided with a knob-like extension 23 which substantially fills the cavity 22, sufficient clearance being afforded between the rubber and the cavity to enable the rubber to flow under compression in the operation of the pump. To afford strength and a certain amount of rigidity to the knob-like extension 23, a core 24 has its inner end bonded to the metallic bushing 20 and is molded within the flexible extension 23 so that on all sides, with the exception of the side contacting the bushing 20, the core 24 is surrounded by relatively flexible and resilient rubber. It will be understood that the core is of such dimensions and quality of rubber such as to afford the desired rigidity and reenforcement for the knob-like extension 23 which is yieldable to afford the desired movement of the pump, the resiliency of the material returning the knob to its normal position within the cavity 22. It will be manifest that the core 24, knob 23 and the sleeve 21 which substantially encircles the bushing 20 may be formed by molding according to any well-known or desired method so that virtually a one-piece member is provided.

Planetary pumps of this general character are well-known in the art so that detail explanation of the pumping operation is not believed necessary because that is well-known to those skilled in this art. It should be mentioned, however, that as illustrated somewhat diagrammatically in Figures 2 to 5, the knob-like extension 23 yields as the eccentric disc rotates to enable the rubber sleeve to be moved into intimate engagement with the side walls of the pumping chamber in a progressive manner creating a fluid-tight translatory contact point with portions of the interior walls. It will be apparent in the position of the eccentric shown in Figure 2 that the relatively rigid core 24 compresses the outer portion of the knob-like extension 23 so that the core has a limited amount of movement inwardly as well as outwardly of the cavity 22. When the eccentric disc is in the position shown on Figure 3, side portions of the extension 23 are compressed, the core tilting slightly relative to the cavity. The opposite condition prevails when the eccentric is in the position shown on Figure 4.

As illustrated in Figure 5, with the eccentric disc in the position opposite to that indicated on Figure 2, the extension 23 is compressed at the shoulders formed by the constriction or neck 23', the core moving away from the end wall of the cavity 22. In this manner, it will be apparent that the resilient rubber about the rigid core 24 is sufficiently flexible to accommodate itself to the movement of the eccentric disc 19 but is also sufficiently resilient to return to its normal position.

In the form shown in Figure 6, the metallic bushing or annulus 20a is preferably thinner and bonded to the outer surface is a relatively thin layer 25 of relatively hard or rigid rubber with which is integral a relatively rigid core 24a. Bonded to the outer surface of the hard rubber sleeve 25 is a relatively thin sleeve or layer 21a of relatively flexible and resilient rubber, this layer being integral with a knob-like extension 23a disposed between the inlet and outlet ports of the pump and which encloses the core 24a after the manner above described. In this form, it will be obvious that a more secure bond is effected between the hard rubber portion and the metallic sleeve 20a, thus affording greater assurance that the bond between the hard rubber core and the metallic sleeve will not loosen.

It is to be understood that numerous changes in details of construction, arrangement and operation may be effected without departing from the spirit of the invention especially as defined in the appended claims.

What I claim is:

1. In a pump of the character described, a casing having spaced inlet and outlet ports communicating with a pump chamber, an outwardly extending cavity disposed between said ports, having an enlarged terminal portion and a reduced neck portion at its junction with said pump chamber, an eccentric disc rotatable in the pump chamber for forcing fluid from the inlet to the outlet port, a metal annulus encircling said eccentric disc and having bearing thereon, a layer of resilient rubber bonded to said annulus and formed with an integral extension projecting into said outwardly extending cavity, said integral extension being formed with an enlarged head substantially filling the terminal portion of such cavity, and a core of harder rubber embedded in said integral extension and bonded to said metal annulus, said core being of the general shape of the integral extension in which it is embedded, with an intermediate portion of reduced thickness in the region of the aforesaid reduced neck portion of the cavity.

2. In a pump of the character described, a casing having spaced inlet and outlet ports, a rotatable eccentric within said casing, a member having a rubber surface concentric with said eccentric and within which the latter is rotatable, the surface of said member being caused by said eccentric to create a fluid-tight translatory contact successively with portions of the interior wall of the casing and to open and close said ports during each revolution of said eccentric, a lateral extension on said member, a core of harder rubber than the rubber of said surface embedded in said extension, and means for retaining said extension in a position intermediate said ports.

3. In a pump of the character described, a casing having spaced inlet and outlet ports, a rotatable eccentric within said casing, a member having a rubber surface concentric with said eccentric and within which the latter is rotatable, the surface of said member being caused by said eccentric to create a fluid-tight translatory contact successively with portions of the interior wall of the casing and to open and close said ports during each revolution of said eccentric, a lateral extension integral with said surface, a core of harder rubber than the rubber of said surface embedded in said extension and bonded to said member, and means for retaining said extension in a position intermediate said ports.

MALCOLM W. FRASER.